United States Patent [19]

Kuhn et al.

[11] 4,066,896

[45] Jan. 3, 1978

[54] IONOGRAPHIC CHAMBER

[75] Inventors: Gerhard Kuhn, Erlangen; Karl Ubler, Spardorf; Karl-Hans Reiss, Erlangen, all of Germany

[73] Assignee: Siemens Aktiengesellschaft, Berlin & Munich, Germany

[21] Appl. No.: 686,801

[22] Filed: May 13, 1976

[30] Foreign Application Priority Data

June 19, 1975 Germany ............................ 2527253

[51] Int. Cl.$^2$ .............................................. G03B 41/16

[52] U.S. Cl. ................................................ 250/315 A

[58] Field of Search .................... 250/315, 315 A, 480

[56] References Cited

U.S. PATENT DOCUMENTS 3,803,411 4/1974 Reiss ................................ 250/315 A
3,828,192 8/1974 Morsell ............................ 250/315 A
3,963,924 6/1976 Boag et al. ........................ 250/315 A

*Primary Examiner*—Bruce C. Anderson
*Attorney, Agent, or Firm*—Hill, Gross, Simpson, Van Santen, Steadman, Chiara & Simpson

[57] ABSTRACT

An ionography chamber with spherically curved electrodes, in which an electrically insulating sheet is located between the spherically curved electrodes and covers one of these electrodes. The covered electrode has an uneven shape near its edge, and a gas is admitted into a space between the sheet and the other electrode. The uneveness of one of the electrodes is in the form of a groove running along the edge of the electrode, or a rib attached along the edge of the electrode. A pressure difference is generated for the purpose of pressing the sheet against the electrode with the uneven shape. The pressure difference causes the sheet to be tightly bonded to the respective electrode.

7 Claims, 3 Drawing Figures

IONOGRAPHIC CHAMBER

BACKGROUND OF THE INVENTION

The present invention relates to an ionographic chamber of the type known from U.S. Pat. No. 3,828,192.

With high-pressure ionography chambers, a gas layer, which is heavy in comparison with low-pressure chambers, i.e., of about 1 cm, is being used. As a rule, this layer is curved spherically so that the electric lines of force coincide with the direction of incident rays. As is well known in the art, rays used in radiography, particularly X-rays, emanate from a point and propagate spherically in all directions so that the section used for a picture has rays along spherical radii. Due to the curvature of the gas layer, the length of the ray paths in the chamber becomes the same at all points, so that a uniform image may be expected. In order to obtain the charge images that are conventional in ionography, an electrically insulating sheet or foil is placed in front of one of the electrodes in the direction of the opposite electrode. Therefore, this foil also must have the curved shape. It is difficult to achieve a pleat-free adherence to the electrode. With the prior art arrangement mentioned above, complex holding means are provided, which include a number of clamping strips pre-tensioned by springs. The construction is such that these clamping strips first grasp the sheet foil which then is stretched.

It is, therefore, an object of the present invention to avoid, in an ionographic chamber in accordance with the present invention, complex constructions for the curved attachment of the image picture foil and to use the design elements absolutely necessary for the chamber.

Another object of the present invention is to provide an ionographic chamber of the foregoing character which may be economically fabricated and readily maintained in service.

A further object of the present invention is to provide an ionographic chamber, as described, which has a substantially long operating life.

SUMMARY OF THE INVENTION

In accordance with the present invention, the location of unevennesses or contouring, i.e. depressions or projections, at the rim of the electrode, which is covered with foil, prevents the formation of pleats. This is due to the fact that the unevennesses or contouring on the rim of the electrode where the greatest deformation of the foil must take place cause reversible stretchings which assist in adapting the foil to the curvature to which high pressure is applied inside the chamber. When using a foil of sufficient elasticity, upon removal of the foil, a planar structure returns. This change of form does not result in distortion, because the necessary bends have a radius of 80 to 120 cm, particularly 100 cm. A suitable foil would be made of an electrical insulating material of sufficient elasticity. Such materials are, e.g., polyester, polycarbonate, polyvinyl chloride. The amount of bending with X-ray or isotope picture is minimal; as a rule, the limited format is adapted to the human body dimensions, and is 20 × 25 cm for mamography pictures, and the bend is 8 mm, assuming a radius of curvature of 100 cm. Therefore, no large demands are made of the elasticity of the foil.

According to the present invention, no additional elements are required, particularly for high-pressure ionography chambers. The pressing-on of the foil is solely achieved by the pressure of the gas being used. For this purpose, one need only use a tightly closed box, as in conventional chambers, in which the two electrodes face each other. The foil is placed between the electrodes and, after closing the chamber and tightly mounting the foil between the electrodes, the high-pressure gas required for taking the picture must be admitted on that side of the foil where the uncovered electrode is located. Due to the pressure of the gas, the foil is pressed against the one electrode without additional means required. Because the arrangement with unevennesses, in accordance with the present invention, the foil makes no pleats, without requiring additional components.

With low-pressure chambers, such adherence is also possible. It is merely necessary to provide the pressure difference, resulting with the high-pressure chamber upon entry of the gas, at the electrodes. This is achieved by producing an under-pressure (suction pressure or vacuum) on that side where the electrode to be covered with foil is located. This may be adequately accomplished by a water jet pump.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
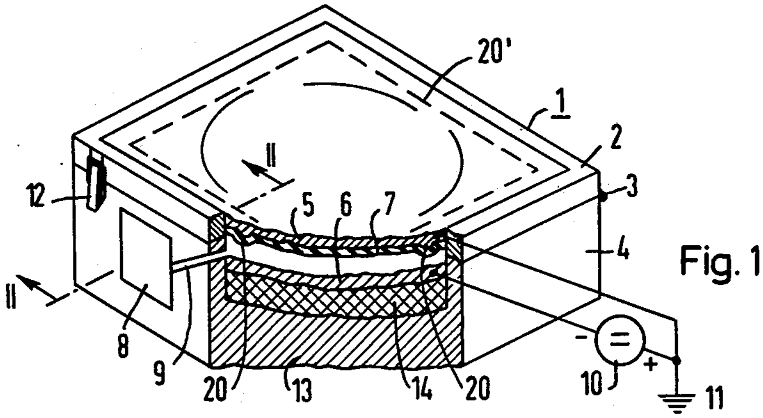
FIG. 1 shows a perspective drawing of a high-pressure ionography chamber with parts broken away.

In FIG. 1, a housing, comprising a cover 2 which is fastened by a hinge 3 to a bottom part 4, holds the electrode arrangement having electrodes 5 and 6. With outside dimensions of 20 to 25 cm, both electrodes are partial hollow spheres and are made of beryllium or graphite-fiber-reinforced epoxy resin 5 and aluminum 6 with a thickness of 10 mm. On the inside, i.e., on its convex side, an electrically insulating sheet foil 7 is fastened to electrode 5. The sheet foil is made of polyester and has a thickness of 200 μm. The distance remaining between foil 7 and electrode 6 is 10 mm. To generate the overpressure, there is located next to housing 1 a compressor 8 which is connected via line 9 to the space between the electrode 6 and the foil 7. A 10 kV voltage, furnished by a DC source 10, is applied to the electrodes. The minus (plus) pole is connected directly to electrode 6 on the inside of housing 1, and the plus (minus) pole, which is connected to ground 11, is connected to electrode 5. Opposite hinge 3 are closures or clasps of which the one located at the left-hand corner of housing 1 has the reference numeral 12. Opposite the grounded bottom 4 of housing 1, there is electrode 6 insulated in an element 13, FIG. 2, of epoxy resin.

Figure 2:
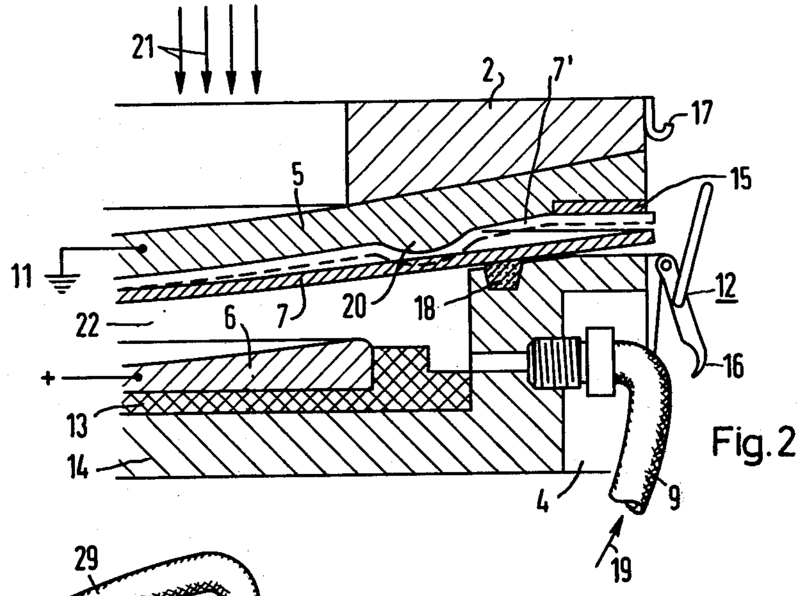
FIG. 2 shows a section taken along line II—II of FIG. 1.

FIG. 2 shows that on the rim of cover 2 there is a guide rail 15 which ensures solid positioning of the foil in relation to both electrodes 5 and 6 when actuating the closure clasps of which the one designated by 12 is shown in FIG. 1. The latter has, in the conventional manner, the lever arrangement 16 on the bottom 4 and the catch 17 on the cover. There is also provided a seal gasket 18 which is located opposite guide rail 15 in part 4 of housing 1 and contacts the bottom side of foil 7. Foil 7 makes contact with electrode 5 after compressed gas under a pressure of 10 bar has been introduced through line 9 in the direction of arrow 19. The gas, in this case xenon or Frigen 13 B 1, expands in the space between the electrode 6 and foil 7 and presses the latter against that wall of electrode 5 which faces the inside of the chamber, while the air can escape laterally between foil 7 and electrode 5 above guide rail 15. On the rim, the 10 mm wide and 5 mm high rib 20, of the same material as electrode 5, is tightly covered as indicated in FIG. 2 by the broken lines 7'. The rib is attached to electrode 5. This causes, as explained above, an adaptation of the previously straight foil 7 to the wavy shape or contouring of electrode 5. The foil material which becomes excessive during the deformation from the cylindrical into the spherical form is pushed into the depressions along ribs 20 on the side.

The X-rays, upon arrival, as indicated by arrows 21 in FIG. 2, penetrate the electrode 5 and foil 7. They then pass into the gas chamber 22 between foil 7 and electrode 6. There, electrons and ions, of which the positive ions are collected on foil 7, are released. Since the release of ions depends on the intensity of rays 21 and their distribution, an electrostatic image is produced on foil 7 in the known conventional manner. This image can be made visible in a known manner as in the xerography procedure, by spreading pigmented dielectric powder and fixing it by fusing.

Figure 3:
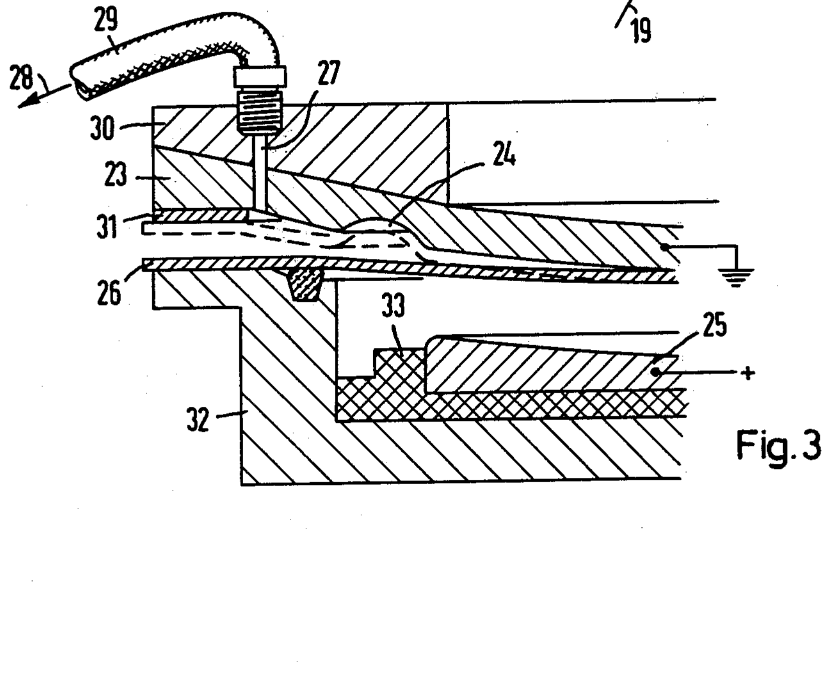
FIG. 3 shows a similar section of a chamber where the sheet foil is held by suction.

In the section shown in FIG. 3, the main difference from the other figures is that the irregularities or contouring of the electrode 23 to be covered consist of a depression 24 which is located at the rim of electrode 23 to conform to rib 20. Since the chamber of FIG. 3 is one where the space between electrode 23 and electrode 25 contains low-pressure gas, the adherence of the polyester foil 26 used here is achieved by suction in the direction of arrow 28 through a channel 27 shown inside electrode 23. For this purpose, a pump (not shown) is connected via a hose 29 to channel 27 in the conventional manner. Since the chamber shown in section in FIG. 3 does not differ from the other chambers with respect to its electrical operation, the remaining parts, also, are identical with those shown in FIGS. 1 and 2. In a similar manner and with the same function, a cover 30 with a gasket 31 is being used, as well as bottom part 32 of the housing. In this embodiment also, the lower electrode, i.e., electrode 25, is located inside the element 33 of epoxy resin. When producing the image with this arrangement as with that of FIG. 1, the applied voltages being about the collecting of charged particles on foil 26, which then can be made visible and fixed by the standard xerographic procedures.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

We claim:

1. An ionography chamber with spherically curved first and second electrodes comprising, in combination, an electrically insulating sheet between said curved electrodes and covering said first electrode; means for applying an electrical potential between said electrodes; said first electrode having depression or projection contouring near its edge covered by a portion of said sheet; means forming a chamber between the sheet and the second electrode; and means for admitting a gas into said chamber between said sheet and the second electrode and means generating a pressure dfference whereby the pressure between said first electrode and said sheet is less than the pressure in said chamber between the sheet and the second electrode.

2. The chamber as defined in claim 1 wherein said contouring comprises a groove extending along the edge of said first electrode.

3. The chamber as defined in claim 1 with said contouring comprising a rib along the edge of said first electrode.

4. The chamber as defined in claim 1 wherein said generating means supplies said gas to said chamber at a pressure to produce a pressure difference sufficient to press said sheet against said first electrode and the contouring thereof.

5. The chamber as defined in claim 4, with said admitting means comprising a compressed gas line discharging into said chamber between said second electrode and said sheet, said sheet being tightly conformed to the contouring of said first electrode.

6. The chamber as defined in claim 1, with said generating means comprising suction line means communicating with the contouring of the first electrode for producing the pressure difference and said pressure difference being of a magnitude to force said sheet into tightly conforming relation to the contouring of said first electrode.

7. The chamber as defined in claim 6, wherein said suction line means comprises duct means extending through said first electrode, and means for connecting said duct means to a suction source.

* * * * *